United States Patent

Linton et al.

[15] 3,646,525

[45] Feb. 29, 1972

[54] DATA REGENERATION SCHEME WITHOUT USING MEMORY SENSE AMPLIFIERS

[72] Inventors: Richard H. Linton, Poughkeepsie, N.Y.; Thomas L. Palfi, Mountainview, Calif.

[73] Assignee: International Business Machines Corporation, Armonk, N.Y.

[22] Filed: Jan. 12, 1970

[21] Appl. No.: 2,292

[52] U.S. Cl.........................340/173 CA, 307/238, 307/279, 340/173 R

[51] Int. Cl...................G11c 7/00, G11c 11/24, G11c 11/40

[58] Field of Search..............340/173 FF, 173 CA; 307/238, 307/279

[56] References Cited

UNITED STATES PATENTS

| | | | |
|---|---|---|---|
| 3,181,129 | 4/1965 | Freedman | 340/174 |
| 3,387,286 | 6/1968 | Dennard | 340/173 FF |
| 3,434,120 | 3/1969 | Olsen | 340/173 |

*Primary Examiner*—James W. Moffitt
*Assistant Examiner*—Stuart Hecker
*Attorney*—Hanifin and Jancin and James E. Murray

[57] ABSTRACT

This specification discloses a scheme for regenerating the data in stored-charge storage cells of monolithic memories. The scheme involves the periodic reading out of the data in the stored-charge storage cells and temporarily storing the data in a regeneration cell. Thereafter the data is read out of the regeneration cell and back into the storage cell to complete the regeneration cycle.

7 Claims, 2 Drawing Figures

INVENTORS
RICHARD H. LINTON
THOMAS L. PALFI

BY James E. Murray
ATTORNEY

DATA REGENERATION SCHEME WITHOUT USING MEMORY SENSE AMPLIFIERS

BACKGROUND OF THE INVENTION

This invention relates to monolithic memories and more particularly to the regeneration of data and stored-charge storage cells as opposed to bistable storage cells.

Copending application Ser. No. 853,353, filed Aug. 27, 1969, now U.S. Pat. No. 3,585,613, and entitled "Field Effect Transistor Capacitor Storage Cell" discloses a storage cell which stores data in the form of electrical charge on an interelectrode capacitance of a first field effect transistor and is addressed for reading and writing through two other field effect transistors. The addressing field effect transistors are biased-off while the storage cell is not being addressed for reading and writing so that the charge stored in the interelectrode capacitance of the first field effect transistor will have to be dissipated through the off-impedance of the addressing field effect transistors. However, no matter how high these off-impedances are, in time the charge on the first field effect transistor will be dissipated and the data stored will be lost in this type of storage cell. To overcome this characteristic of a stored-charge-type storage cell it is necessary to have the data in the storage cell periodically regenerated or in other words the electrical charge be restored at sufficiently short intervals to be sure that the data stored in the storage cell will not be lost due to leakage.

In copending application Ser. No. 886,277 filed on Dec. 18, 1969, and entitled "Data Regeneration System For Stored-Charge Storage Cell" it was suggested that the data be read out of the storage cell onto an address line for the storage cell and there stored in the line capacitance of the cell. The problem with this means of regeneration is that it requires two regeneration steps to restore the data to its true form. The data must be read out onto the line and back into the cell and then read out onto the line and back into the cell again in order to get the true data back into the storage cell. This is because the reading out of the data onto the line causes an inversion of the data with the mentioned means.

BRIEF DESCRIPTION OF THE INVENTION

In accordance with the present invention the regeneration of data is accomplished by the use of a regeneration cell. An inversion of the data takes place in the reading of the data out of the regeneration cell to compensate for the inversion caused by the reading of the data out of the storage cell, thereby permitting the true data to be inserted back into the storage cell in one read-out and read-in cycle. This of course cuts the time required to regenerate the data and has enabled the time to be more advantageously employed.

Therefore, it is an object of the present invention to provide a new regenerating scheme for a stored-charge storage cell.

It is another object of the invention to provide a faster regeneration scheme for a stored-charge storage cell and It is a further object of the invention to provide a stored-charge storage cell that employs a dummy cell attached to the addressing wires for the regeneration of the data in the cell.

DESCRIPTION OF THE DRAWINGS

These and other objects, features and advantages of the invention will be apparent from the preferred embodiment of the invention as illustrated in the accompanying drawings, of which.

DESCRIPTION OF THE EMBODIMENT OF THE INVENTION

Figure 1:
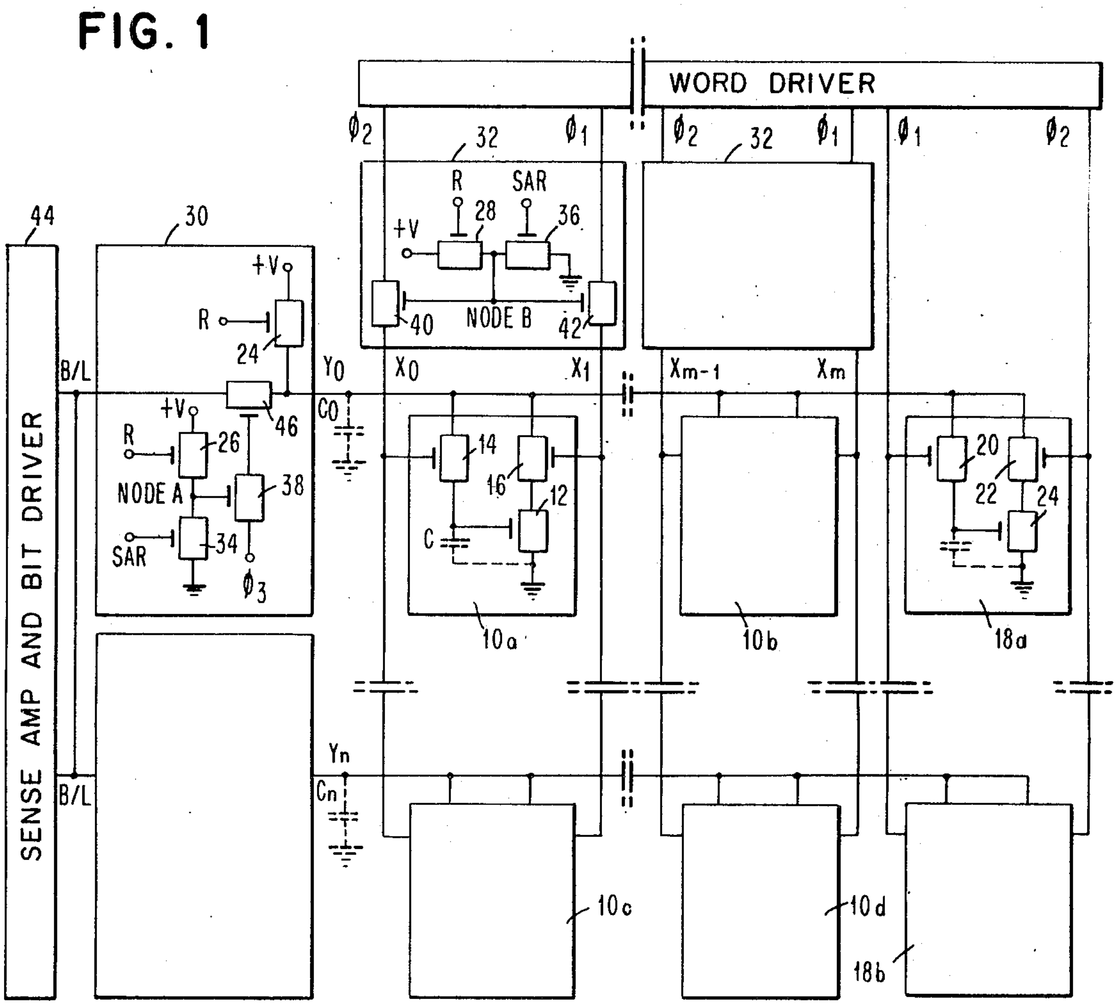
FIG. 1 is an electrical schematic of a monolithic memory fabricated in accordance with the present invention.
Figure 2:
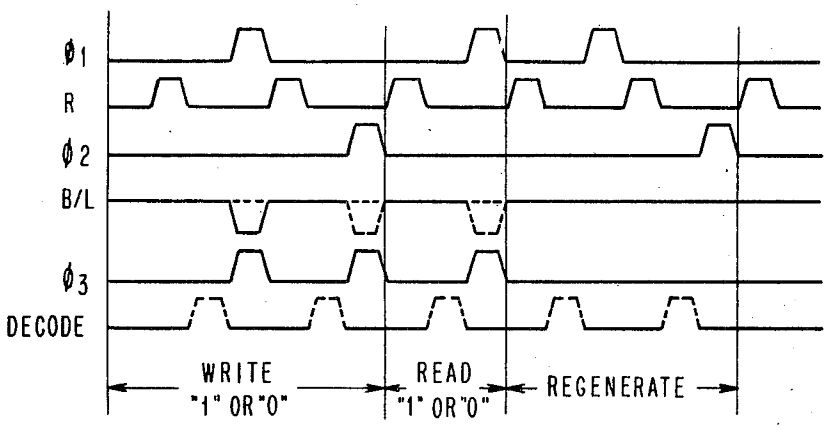
FIG. 2 is a graph of potentials employed in accessing the storage cells and regenerating the data in the storage cells in the memory shown in FIG. 1.

FIG. 1 shows a memory in which the storage cells 10 are accessed by word lines XO through X*n* and bit lines YO through Y*n*. The cells are identical and are identically addressed in the matrix. Therefore as shown for storage cell 10*a* each storage cell is addressed by two word lines XO and X1 and one bit line Y0 and employs the capacitance C between the gating terminal and source terminal of an insulated gate field effect transistor 12 as the storage element of the cell. When the capacitor C is discharged a binary "0" is stored in the cell and when the capacitor C is charged a binary "1" is stored in the cell.

The storage FET 12 is addressed by two addressing FET's 14 and 16. The FET 14 connecting the gate of transistor 12 to the YO bit line and X0 word line is the write FET for the storage cell while the FET 16 coupling the drain of the FET 12 to the YO bit line and the X1 word line is the read FET.

Along with the storage cells 10, each of the bit lines Y0 to Y*n* has a regeneration storage cell 18 connected to it. These regeneration cells are identical to the storage cells. They employ the capacitance C between the gating terminal and the source terminal of an FET 24 as the storage element of the cell. When this capacitor C is discharged a binary "0" is stored in the cell and when the capacitor is charged a binary "1" is stored in the cell. Again the storage FET 24 is addressed by two addressing FETs 20 and 22. The FET 20 connecting the gate of FET 12 to the Y0 bit line and the 01 word line is the write FET for the storage cell while the FET 22 coupling the drain of FET 18 to the Y0 bit line and the 02 word line is the read FET.

While the storage cells 10 are not being addressed for reading, writing or regeneration FET devices 14 and 16 are maintained off. This means that charge on capacitor C of the storage cell will be maintained for considerable time since the off impedances of devices 14 and 16 and the gate to drain impedances and gate to source impedances of device 12 are very high.

In addressing the memory for reading, writing or regeneration a pulse R is first applied to the gate of FET's 24, 26, 28 in all the bit and word line decoders. This charges the bit line capacitances CO through C*n* and also charges the nodes A and B in all the bit and word line decoders 30 and 32. After the charging of the nodes and the bit lines an up decode pulse is applied to the gate of FET's 34 and 36 in all the nonselected word and bit line decoders 30 and 32 discharging the nodes A and B in those decoders thereby preventing 0 1, 0 2 and 0 3 pulses from effecting the data in these cells. In the selected cells no such decode pulse is applied to the transistors 34 and 36 leaving the nodes A and B charged thus allowing pulses to be transmitted through FETs 38, 40 and 42.

If we assume cell 10*a* has been properly addressed as described above, a write cycle can be performed once the decode pulses have ended. During the write cycle a 0 1 pulse and a 0 3 pulse are simultaneously applied to the selected storage cell 10*a* and to the dummy cell 18*a*. This causes devices 16 and 20 to conduct so that the data in the selected cell 10*a* is read out onto the Y0 bit line and into the restoration cell 18*a*. If a "1" is to be stored in the storage cell 10*a*, the Y0 bit line is driven down by the bit line driver 44 concurrent with the 0 1 and 0 3 pulses. This overrides the transfer of data from the storage cell 10*a* to the restoration cell 18*a* by causing the capacitor C in the regenerative cell to be discharged storing a "O" in the regenerative cell 18*a* irrespective of the data stored in the storage cell 10*a*. If a "0" is to be stored in the cell the YO bit line of capacitor CO is maintained at its charged level so that the data in the cell 10*a* is not overriden and is placed through device 20 into the capacitor C of cell 18*a*. After the 0 1 and 0 3 pulses subside a restore pulse is applied to the transistors 24 to restore the charge on the bit line capacitor C0 to CN in case it was discharged in the transfer of data and an up decode pulse is applied to the decoders for the nonselected cells to assure that they are unaffected by the reading and writing of the data. After restoration of the line capacitance CO to CN, a 0 2 and a 0 3 pulse are simultaneously applied. This again connects the YO bit line to the bit drivers by rendering transistor 46 conductive and also turns the write transistor 14 in the storage cell and read transistor 22 in the regenerative cell 18*a* on. If a "1" is to be stored in the storage cell 10*a* and for this reason a "O" had been placed in the regenerative cell 18*a* earlier the occurrence of the 0 2 and 0 3 pulses at this times leaves the bit line capacitance CO charged as there is no charge on capacitor C in the regenerative cell 18*a* to render device 24 conductive to short capacitor CO to ground. Therefore the charge on the capacitor line CO is transferred through device 14 onto the capacitor C of the storage cell 10*a* charging that capacitor C to store a "1." If a "O" is to be stored in the cell the YO bit line is driven down by the bit line driver 44 concurrent with the 0 2 and 0 3 pulses to discharge the line capacitor CO thereby overriding the data stored in the regenerative cell 18*a*. With device 14 conducting at this time this means that the capacitor C will be discharged through device 14 onto the line thereby storing a "O" in the storage cell 10*a*. With the writing complete the transistors 14, 16, 20 and 22 are returned to their off states leaving the cell 10*a* in the desired "0" or "1" condition.

To read data out of the storage cell 10*a* after it has been accessed in the manner described previously the read transistor 16 is rendered conductive by a 0 1 pulse applied to the X1 lines through the device 42. If the capacitor C is charged at this time, device 12 will conduct shorting the YO bit line to ground through device 16 and 12. This discharges the line capacitance CO to ground potential and produces a pulse on the YO bit line. If the capacitor C is not charged device 12 will not conduct so that a current path is not provided to ground potential through devices 16 and 12 when the 0 1 pulse is applied to the X1 word line. In this case capacitor CO is not discharged and the potential on the YO bit line remains substantially unchanged. Simultaneously with the application of the 0 1 pulse on the X1 line a 0 3 pulse is applied to the drain of device 38. Being in a decoder for a selected cell 10*a*, device 38 is conductive and applies 0 3 pulse to the gate of FET 46 which then conducts coupling the YO bit line to the sense amplifier and bit driver 44. Therefore if a "1" is stored in the storage cell 10*a* the pulse produced on the YO sense line when the data is read will be detected and recognized by the sense amplifier as a stored "1." If a "0" is stored in the cell 10*a* the absence of the pulse on the YO sense line will be detected by the sense amplifier and recognized as a stored "0." After completion of the read cycle all the bit lines are restored by a restore pulse as are the nodes A and B in the decoders.

As mentioned previously the storage cells 10 are not bistable but relay on storage of charge in the capacitor C. Thus the charge on capacitor C will leak off in time causing data in the storage cell to be lost unless the charge is not somehow restored periodically. In accordance with the present invention charge is restored periodically by the use of the restoration cells 18*a*. After the storage cell has been properly accessed as described previously, a 0 1 pulse renders transistor 16 conductive in the storage cell 10*a* to be restored reading the data out onto line YO as described previously. The 0 1 pulse also renders device 20 conductive placing the data read out onto the YO line into the restoration cell 18*a*. If a 37 1" is stored in the storage cell 10*a* devices 16 and 12 are conductive thereby discharging the line capacitance CO. In this case the capacitor C in the restoration cell 18*a* will remain uncharged storing a "0" in the restoration cell. If a "0" had been stored in the storage cell 10*a* the capacitor CO will remain charged charging the capacitor C in the restoration cell 18*a* and thereby store a "1" in the restoration cell 18*a*. Thus irrespective of the data in the cell 10*a* the complement of that data is stored in the restoration cell 18*a* during the first portion of the regeneration cycle.

After the complement of the data in the cell 10*a* has been placed in the restoration cell 18*a* the bit lines are then again restored by a restoration pulse and decode pulses are employed to access the proper storage cells. This brings the bit line capacitance back to an up potential irrespective of the data previously read out onto the line.

To complete the restoration cycle, the data in the restoration cell 1 must be placed back into the storage cell. This is accomplished by first applying a 0 2 pulse to both the storage cell 10*a* and the restoration cell 18*a*. The 0 2 pulse renders device 22 conductive reading the data stored in the restoration cell 18*a* out onto the YO bit line. The 0 2 pulse also renders device 14 conductive allowing potential on the YO line to affect the charge in capacitor C. If a "0" had been stored in the restoration cell 18*a* this would mean that the charge on the line capacitor CO would remain charged and therefore charge capacitor C storing a "1" in the cell 10*a*. If a "1" had been stored in the restoration cell 18*a* this would mean the line capacitor CO would be discharged when the 0 2 pulse occurs and therefore would cause the capacitor C in the storage cell 10*a* to be discharged. Thus the data is complemented again restoring in the storage cell 10*a* the same data previously stored in their unrestored form.

As can be seen restoration is accomplished with one read and one write. Therefore it has the advantage over copending application Ser. No. 886,277 filed on Dec. 18, 1969 that it cuts the time required for restoration considerably allowing more time for the memory to perform its machine functions.

The devices 34 and 36 in the decoders 30 and 32 are shown as single devices. However, they are representative of any number of devices coupled in shunt with them to perform the decoding function. If any one of these shunt devices is conducting, the cell the decoder services will not be selected. If when all the devices are nonconducting the cell the decoder services is selected.

The memory here is a word-oriented memory that is by selection of the decoder for XO and X1 word line cells arranged in a word along the XO and X1 word lines are accessed as described for cell 10*a* but only one of the cells is connected to the sense amplifier and bit driver during read or write cycles. All cells of the word line go through a regeneration function simultaneously as described above. In the case of the write function the data stored in any particular cell will of course depend on the data reaching the bit line from the bit driver.

All the described FET devices are enhancement mode insulated gate field effect transistors. By application of voltage to the gates of any one of these devices the device is made more conductive.

Therefore it should be understood by those skilled in the art that various changes in form and details may be made therein without departing from the spirit and scope of the invention.

What is claimed is:

1. In a memory made of a matrix of stored-charge memory cells each addressed by the selection of a plurality of lines out of a grid of addressing lines for the matrix, a data regeneration scheme for periodically restoring the data stored in the memory cell without reading the data out through the sense amplifiers of the memory, comprising:

read means for reading data stored in any given cell out onto one of the plurality of lines for addressing the cell;

restore cell means coupled to said one of the plurality of lines for taking the data read out onto said one of the plurality of lines directly off said one line without reading the data out through a sense amplifier and temporarily storing the data so taken; and write means for writing the data stored in the restore cell means back into the given storage cell.

2. The matrix of claim 1 wherein said storage cells and restore cells are three device cells each with a first device storing data in the form of charge on one of its interelectrode capacitances;

a second device for charging and discharging the interelectrode capacitance of the first driver onto said one of the plurality of lines for addressing the cell; and a third device for placing a signal on said one of the plurality of lines indicative of the data stored in the interelectrode capacitance of said first device.

3. The matrix of claim 2 including means for rendering the third device of said storage cell and the second device of said restore cell conductive at the same time to transfer the data stored in the storage cell into the restore cell; and means for rendering the second device of said storage cell and the third device of said restore cell conductive at the same time to transfer data placed in the restore cell back into the storage cell whereby the data on the storage cells can be periodically restored.

4. The matrix of claim 3 wherein said devices are field effect transistors.

5. A word-oriented matrix of stored-charge memory cells comprising:

a. a plurality of word and bit lines;

b. a plurality of stored charge storage cells each having i. a first semiconductor device which is rendered conductive or nonconductive to store data by the changing of the charge level on one of its interelectrode capacitances;

ii. a second semiconductor device which couples said one of the interelectrode capacitances to one of the bit lines for charging and discharging said interelectrode capacitance in response to signals on a first of the word lines;

iii. a third semiconductor device which forms a series circuit with the first of the semiconductor devices that shorts first one of the bit lines to ground in response to signal on a second of the word lines when the first semiconductor device is conductive;

c. a regenerative cell associated with each of the bit lines and each having:

i. a first conductive device which is rendered conductive or nonconductive to store data by the changing of the charge level in one of its interelectrode capacitances;

ii. a second semiconductor device which couples said interelectrode capacitance to one of the bit lines for charging and discharging said interelectrode capacitance in the restoration cell in response to signals on a third of the word lines; and iii. a third semiconductor device which forms a series circuit with the first of the semiconductor devices of the regenerative cell that shorts said one of the bit lines to ground in response to signals on a fourth of the word lines when the first of the semiconductor devices in the regenerative cell is conductive; and d. restoration means for periodically transferring data between said storage cells and said restoration cells to restore the data in the storage cells.

6. The word oriented matrix of claim 5 including:

means coupled to the second and third word lines for rendering the third device of a storage cell and the second device of a regenerative cell conductive at the same time to transfer the data stored in the storage cell into the regeneration cell and means coupled to the first and the fourth lines for rendering the second device of a storage cell and the third device of a regenerative cell conductive at the same time to transfer the data placed in the storage cell back into the storage cell whereby data in the storage cells can be periodically restored.

7. The matrix of claim 6 wherein said devices are field effect transistors.

* * * * *